April 23, 1963 R. A. FOSTER 3,087,113
DETECTOR FOR GAS CHROMATOGRAPHY
Filed Jan. 23, 1961

INVENTOR
RICHARD A. FOSTER
BY HIS ATTORNEYS
HARRIS, KIECH, RUSSELL & KERN

United States Patent Office 3,087,113
Patented Apr. 23, 1963

3,087,113
DETECTOR FOR GAS CHROMATOGRAPHY
Richard A. Foster, La Habra, Calif., assignor to Beckman Instruments, Inc., a corporation of California
Filed Jan. 23, 1961, Ser. No. 84,184
8 Claims. (Cl. 324—33)

This invention relates to detectors for use in gas chromatographs and the like and, in particular, to ionization-type detectors which provide an output indication that is a function of the quantity of ionizable material present in a sample gas stream. Detectors of this general type are described in the copending application of Burnell et al., Serial No. 38,907, filed June 27, 1960, entitled Ionization Detector, and in the publications cited therein.

In detectors of this type, a supply of electrons is introduced into the sample stream and the electrons are accelerated in a high potential field, producing ions by collision. A typical instrument may have a 2,000 volt power supply with the high voltage electrode, the power supply and the amplifier of the output circuit connected in series. Such an instrument requires either the amplifier, the power supply or the detector to be floated at a high voltage relative to circuit ground, which produces many difficulties in construction and operation. Also, in this type of instrument, the background electron current in the detector is passed through the amplifier. This background current does not supply any signal indicating content of the sample gas stream and must be bucked out in the measuring system. One arrangement for eliminating the background current from the signal current includes introducing an additional electrode into the ionization chamber. This electrode may be at or near ground potential or below ground potential. The electron stream diffusing to the high potential electrode causes ionization of sample components and some of the ions will migrate to this second electrode producing a current which may be amplified and measured. Such a construction eliminates the effect of background current but does not eliminate effects of field variations. Since a high potential electric field exists in the area of interest in the detector, small variations in the electrical field result in corresponding variations in indicated output which are highly undesirable.

Accordingly, it is an object of the present invention to provide a new and improved ionization detector which does not suffer the disadvantages of the presently known instruments. A specific object is to provide an instrument wherein the detector housing, the high voltage power supply, and the output amplifier may be operated at circuit ground. Another object is to provide such an instrument wherein the background electron current is not connected to the output circuit and, hence, no compensation therefor is necessary.

It is an object of the invention to provide an ionization detector utilizing separate electrodes for the accelerating field and electron collection and the ion collection. A further object is to provide such an instrument wherein the electron collector electrode is operated at a relatively high potential with respect to circuit ground and is separated from the ion collector electrode by a grid maintained substantially at circuit ground. Another object is to provide such an instrument wherein the ion collector electrode may be operated at circuit ground potential or at a relatively low negative potential with respect to circuit ground and is shielded from the electron accelerating field and the electron current.

It is an object of the invention to provide an ionization detector for a gas chromatograph or the like including housing means defining a chamber, means for flowing a stream of sample gas through the chamber, a source of electrons within the chamber, an electron collector electrode positioned within the chamber, an ion collector electrode positioned within the chamber, a grid positioned within the chamber between the electrodes and maintained substantially at circuit ground, a source of positive potential connected to the electron collector electrode, and an output circuit connected to the ion collector elecrode and circuit ground.

It is an object of the invention to provide a new ionization detector which may be used in various physical configurations including those referred to in the aforementioned copending application. Another object is to provide such an ionization detector which may be operated with various electron sources including those referred to in the aforementioned copending application.

The invention also comprises novel details of construction and novel combinations and arrangements of parts, which will more fully appear in the course of the following description. The drawing merely shows and the description merely describes preferred embodiments of the present invention which are given by way of illustration or example.

Figure 1:
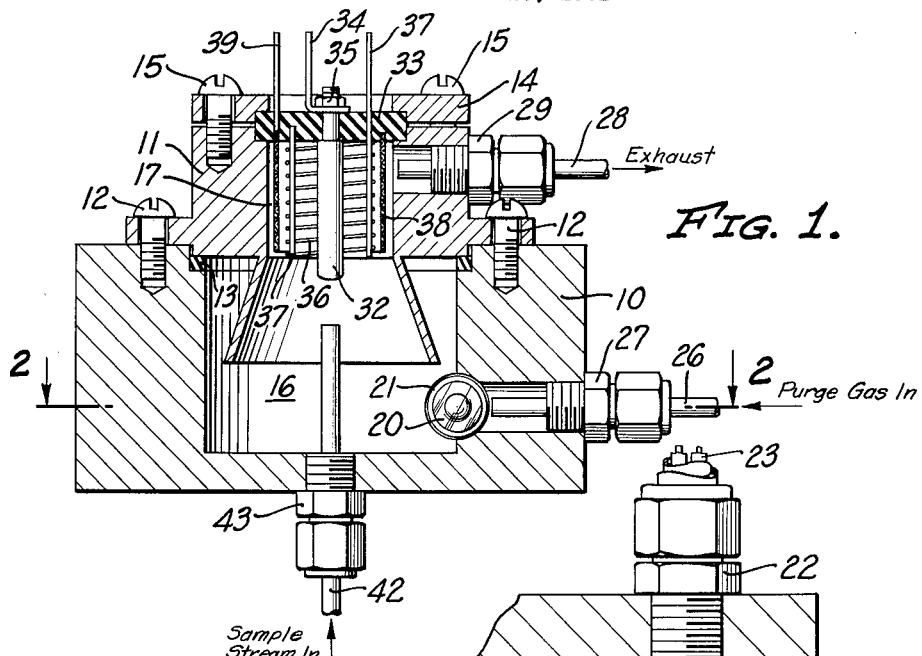
FIG. 1 is a sectional view of a preferred form of the detector.
Figure 2:
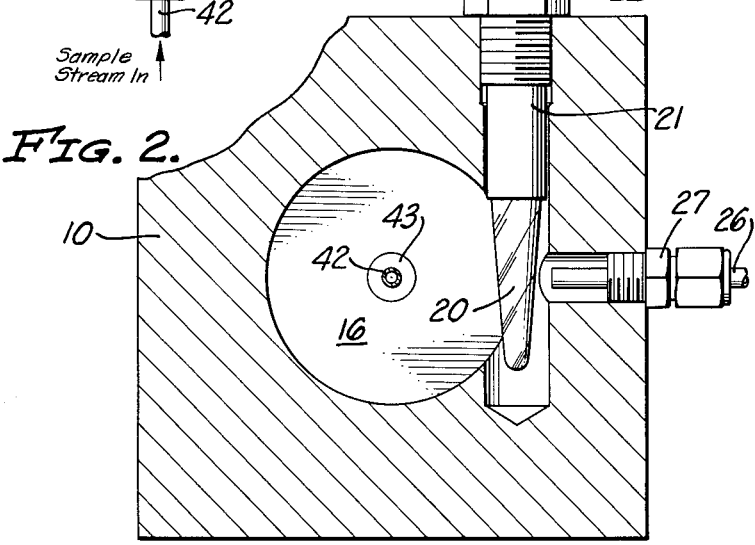
FIG. 2 is a sectional view taken along the line 2—2 of FIG. 1.

The preferred form of the invention shown in FIGS. 1 and 2 includes a housing formed of a cup-shaped body 10, a cap 11 fixed to the body by screws 12 with a sealing gasket 13 therebetween, and a clamp plate 14 fastened to the cap 11 by screws 15. The housing encloses a chamber having a first zone 16 and a second zone 17.

A source of electrons is provided in the first zone 16. In the preferred form shown herein, an ultra-violet lamp 20 is mounted in a socket 21 carried in a fitting 22 inserted in the body 10. The lamp is energized from a suitable power supply through leads 23. The body 10 includes a metallic surface that produces photoelectrons when radiation from the lamp impinges thereon. Typically, the body may be formed of a block of copper which provides the mechanical support for the detector as well as acting as the metallic surface.

A stream of purge gas, typically argon, is directed into the first zone 16 through a line 26 carried in a fitting 27. The purge gas stream is directed to move past the lamp and sweep the photoelectrons from the first zone 16 into the second zone 17, with the purge gas exiting through an exhaust line 28 carried in a fitting 29.

The second zone 17 functions as an ionization chamber. An electron collector electrode 32 in the form of a metal rod is mounted in an insulator 33 which, in turn, is clamped in place by the plate 14. A lead 34 is fastened to the electrode 32 by a nut 35. An open grid 36 in the form of a spiral of wire carried on axial rods projecting from the insulator 33, is positioned around the electrode 32. One of the support rods 37 extends through the insulator 33 to serve as a connecting lead. An ion collector electrode 38 in the form of a sheet metal or fine-mesh screen tube is positioned around the grid 36 and carried in the insulator 33, with a lead 39 attached thereto.

The sample gas stream from the chromatograph column or other source is directed into the chamber through a line 42 carried in a fitting 43.

Figure 3:
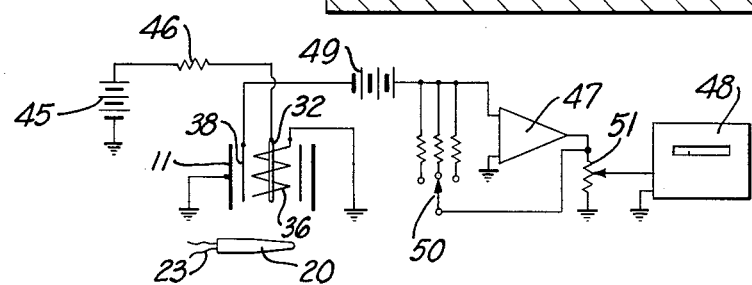
FIG. 3 is an electrical schematic diagram of the instrument of FIGS. 1 and 2.

The electrical circuitry of the instrument is shown in FIG. 3. The electron collector electrode 32 is connceted to the positive side of a D.C. voltage source 45, preferably through a resistor 46 which improves the linearity of the operation, with the negative side of the source 45 connected to circuit ground. The grid 36 is connected to circuit ground. The ion collector electrode 38 is connected to the output circuit, comprising an electrometer amplifier 47 and a recorder 48, ordinarily through another D.C. source 49. The amplifier and recorder are operated at circuit ground. A switch 50 permits selection of the range of the output circuit and a potentiometer 51 functions as an attenuator for the recorder input.

The potential source 45 provides the accelerating field within the ionization chamber and ordinarily is variable over the range of about 300 to 2,000 volts, the particular operating voltage being dependent upon the particular gases involved and the sensitivity desired. The grid 36 is maintained at or near circuit ground so that the strong electrical field exists only between the grid 36 and the electron collector electrode 32. As the electrons are moved into the area between the electrode 32 and the grid 36, they are accelerated and collide with other particles, producing ions of the gas or gases being analyzed for. The electrons are eventually collected at the electrode 32. However, the ions, being positively charged, diffuse past the grid 36 and are collected at the electrode 38. The potential source 49 may be omitted, with the electrode 38 being substantially at circuit ground. However, it is found that the linearity of the instrument is improved, particularly in the higher concentration ranges, if the electrode is opreated at a small negative potential with respect to the grid 36. The source 49 is ordinarily made variable over the range of zero to about 300 volts. The electrode 38 is preferably made of a screen so that gas flow through the chamber is simplified. It would function as an electrode equally well if made of sheet metal.

As the housing including the cap 11 is normally maintained at circuit ground potential, ions tend to be collected at the cap. Maintenance of the ion collector electrode 38 at a slight negative potential with respect to circuit ground substantially eliminates this source of error in measurements. Of course, the cap 11 could be isolated from the remainder of the instrument and itself function as the ion collector electrode, with the screen 38 being omitted.

The theory of operation of the instrument, as presently understood, is described in detail in the aforesaid copending application. The potential at which the electrode 32 is operated is dependent upon the gas or gases used as the carrier gas in the sample stream and the purge gas and on the particular constituents in the sample stream which are being analyzed for. The energy of the accelerated electrons should be such that the constituents being analyzed for are readily ionized by the electrons while the carrier and purge gases are not ionized. Argon is the preferred gas for carrier and purge use, although helium or other noble gases may be used in certain applications.

In the instrument of the present invention, only the ions collected at the electrode 38 contribute to the current input to the amplifier 47. The electron current at the electrode 32 is not connected to the amplifier and, hence, does not have to be bucked out. The output circuit operates completely independently of the electron current. The high voltage supply 45 is not connected into the output circuit and permits both the detector and the output circuit to be operated at circuit ground potential. The grid 36 confines the electrical field to the area between the grid and the electrode 32 so that the electrode 38 is screened from this field and the amplifier 47 is not affected by variations in the field. Also, small variations in output from the electron source do not greatly affect the response of the detector and do not cause instability in the measurement.

It should be noted that various sources of electrons, including those described in the aforesaid copending application, may be used in the detector of the present invention. For example, various metallic surfaces and various radiation sources may be used, the only requirement being that the work function of the metal be less than the energy of the radiation source so that photoelectrons can be produced. Other conventional sources of electrons which have been used include radioactive materials and heated filaments. While the preferred form of the instrument incorporates a two-zone chamber with a purge gas stream for moving the electrons into the ionization chamber, this particular physical structure is not an essential feature of the invention. A single zone chamber may be utilized and the sample gas stream may be used to provide the only gas flow through the chamber.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an ionization detector for a gas chromatograph or the like, the combination of:
   housing means defining a chamber;
   means for flowing a stream of sample gas through said chamber;
   a source of electrons within said chamber;
   an electron collector electrode positioned within said chamber;
   an ion collector electrode positioned within said chamber;
   a grid positioned within said chamber between said electrodes and maintained substantially at circuit ground;
   a source of positive potential connected to said electron collector electrode;
   and an output circuit connected to said ion collector electrode and circuit ground.

2. In an ionization detector for a gas chromatograph or the like, the combination of:
   housing means defining a chamber;
   means for flowing a stream of sample gas through said chamber;
   a source of electrons within said chamber;
   an electron collector electrode positioned within said chamber;
   an ion collector electrode positioned within said chamber;
   a grid positioned within said chamber between said electrodes and maintained substantially at circuit ground shielding said ion collector electrode from said electron collector electrode, with a relatively high positive potential connected to said electron collector electrode and a relatively low negative potential connected to said ion collector electrode;
   and an output circuit connected to the positive side of said negative potential and circuit ground.

3. In an ionization detector for a gas chromatograph or the like, the combination of:
   housing means defining a chamber;
   means for flowing a stream of sample gas through said chamber;
   an ultraviolet lamp positioned within said chamber, said housing means including a metallic surface for generating photoelectrons within said chamber when light from said lamp impinges thereon;
   an electron collector electrode positioned within said chamber;
   an ion collector electrode positioned within said chamber;
   a grid positioned within said chamber between said electrodes and maintained substantially at circuit ground;
   a source of positive potential connected to said electron collector electrode;
   and an output circuit connected to said ion collector electrode and circuit ground.

4. In an ionization detector for a gas chromatograph or the like, the combination of:
  housing means defining a chamber having a first zone and a second zone;
  means for flowing a stream of sample gas through said first and second zones;
  a source of electrons within said first zone;
  an electron collector electrode positioned within said second zone;
  an ion collector electrode positioned within said second zone;
  a grid positioned within said second zone between said electrodes and maintained substantially at circuit ground;
  a source of positive potential connected to said electron collector electrode making said electron collector electrode positive with respect to said ion collector electrode;
  and an output circuit connected to said ion collector electrode and circuit ground.

5. In an ionization detector for a gas chromatograph or the like, the combination of:
  housing means defining a chamber with a first zone and a second zone;
  a source of electrons within said first zone;
  an electron collector electrode positioned within said second zone;
  an ion collector electrode positioned within said second zone;
  a grid positioned within said second zone between said electrodes and maintained substantially at circuit ground;
  a source of positive potential connected to said electron collector electrode making said electron collector electrode positive with respect to said ion collector electrode;
  an output circuit connected to said ion collector electrode and circuit ground;
  first means for directing a stream of rare gas into said first zone;
  a gas outlet from said second zone;
  and second means for directing a stream of sample gas into said chamber, for flow into said chamber through said first and second means, past said electrodes, and out said outlet.

6. In an ionization detector for a gas chromatograph or the like, the combination of:
  housing means defining a chamber with a first zone and a second zone;
  an ultraviolet lamp positioned within said first zone, said chamber including a metallic surface in said first zone for generating photoelectrons when light from said lamp impinges thereon;
  an electron collector electrode positioned within said second zone;
  an ion collector electrode positioned within said second zone;
  a grid positioned within said second zone between said electrodes and maintained substantially at circuit ground;
  a source of positive potential connected to said electron collector electrode;
  an output circuit connected to said ion collector electrode and circuit ground;
  first means for directing a stream of rare gas into said first zone;
  a gas outlet from said second zone;
  and second means for directing a stream of sample gas into said chamber, for flow into said chamber through said first and second means, past said electrodes, and out said outlet.

7. In an ionization detector for a gas chromatograph or the like, the combination of:
  housing means defining a chamber having a first zone and a second zone;
  means for flowing a stream of sample gas through said first and second zones;
  a source of electrons within said first zone;
  an electron collector electrode positioned within said second zone;
  a tubular ion collector electrode positioned within said second zone disposed about said electron collector electrode;
  a tubular grid positioned within said second zone concentrically between said electrodes and maintained substantitly at circuit ground;
  a source of positive potential connected to said electron collector electrode;
  and an output circuit connection in series with a negative potential source between said ion collector electrode and circuit ground.

8. In an ionization detector for a gas chromatograph or the like, the combination of:
  housing means defining a chamber having a first zone and a second zone;
  a source of electrons within said first zone;
  an electron collector electrode positioned within said second zone;
  a tubular ion collector electrode positioned within said second zone disposed about said electron collector electrode;
  a tubular grid positioned within said second zone concentrically between said electrodes and maintained substantitlly at circuit ground;
  a source of positive potential connected to said electron collector electrode;
  an output circuit connected in series with a negative potential source between said ion collector electrode and circuit ground;
  first means for directing a stream of rare gas into said first zone;
  a gas outlet from said second zone;
  and second means for directing a stream of sample gas into said housing means, for flow into said chamber through said first and second means, past said electrodes, and out said outlet.

References Cited in the file of this patent

UNITED STATES PATENTS

| | | |
|---|---|---|
| 2,829,337 | Groendijk | Apr. 1, 1958 |
| 3,001,128 | Nottingham | Sept. 19, 1961 |